United States Patent

Iijima

[11] Patent Number: 5,229,031
[45] Date of Patent: Jul. 20, 1993

[54] LIQUID CRYSTAL DISPLAY DEVICE
[75] Inventor: Chiyoaki Iijima, Suwa, Japan
[73] Assignee: Seiko Epson Corporation, Tokyo, Japan
[21] Appl. No.: 819,570
[22] Filed: Jan. 6, 1992

Related U.S. Application Data
[63] Continuation of Ser. No. 523,955, May 16, 1990, abandoned.

[30] Foreign Application Priority Data
May 17, 1989 [JP] Japan .................. 1-123818

[51] Int. Cl.$^5$ ............ C09K 19/30; C09K 19/52; C09K 19/12; G02F 1/13
[52] U.S. Cl. ............ 252/299.63; 252/299.1; 252/299.66; 252/299.67; 359/103
[58] Field of Search ........... 352/299.1, 299.6, 299.61, 352/299.62, 299.63, 299.64, 499.65, 299.66, 299.67; 359/103

[56] References Cited

U.S. PATENT DOCUMENTS

| | | | |
|---|---|---|---|
| 4,229,315 | 10/1980 | Krause et al. | 252/299.1 |
| 4,253,740 | 3/1981 | Kaynes et al. | 350/350 R |
| 4,372,871 | 2/1983 | Toriyama et al. | 252/299.61 |
| 4,391,370 | 7/1983 | Kuschel et al. | 252/299.1 |
| 4,445,261 | 6/1984 | Sasaki | 260/465 |
| 4,510,069 | 4/1985 | Eidenschink et al. | 252/299.61 |
| 4,514,044 | 4/1985 | Gunjima | 350/350 |
| 4,556,745 | 12/1985 | Corr et al. | 350/350 R |
| 4,634,229 | 1/1987 | Amstutz | 350/346 |
| 4,670,182 | 6/1987 | Fujita et al. | 252/299.61 |
| 5,021,189 | 6/1991 | Sawada et al. | 252/299.61 |

FOREIGN PATENT DOCUMENTS

| | | |
|---|---|---|
| 261614 | 3/1988 | European Pat. Off. . |
| 316186 | 5/1989 | European Pat. Off. . |
| 332005 | 9/1989 | European Pat. Off. . |
| 366985 | 5/1990 | European Pat. Off. . |
| 55058/85 | 12/1985 | Japan . |
| 63-196685 | 8/1988 | Japan . |
| 159256/91 | 6/1991 | Japan . |
| WO8908692 | 9/1989 | PCT Int'l Appl. . |
| 2155465 | 9/1985 | United Kingdom . |

OTHER PUBLICATIONS

First page, including abstract of PCT application No WO 90/04622.

Primary Examiner—Robert L. Stoll
Assistant Examiner—Shean C. Wu
Attorney, Agent, or Firm—Blum Kaplan

[57] ABSTRACT

A liquid crystal display device including a super twisted nematic liquid crystal material with a twist angle between about 180° and 360°, including between about 5 and 40 weight percent of a liquid crystal compound terminating with a cyano group or a fluoro group. The composition may also include at least about 10 to 60 weight percent of a liquid crystal compound having a

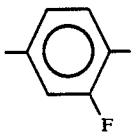

group, a

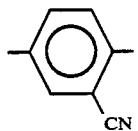

group, a

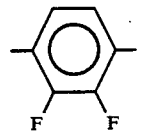

group, or a

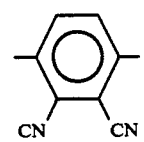

group. The thickness of the liquid crystal layer is between about 2 and 5.5 μm.

11 Claims, 3 Drawing Sheets

LIQUID CRYSTAL DISPLAY DEVICE

This is a continuation of application Ser. No. 07/523,955, filed May 16, 1990, now abandoned.

BACKGROUND OF THE INVENTION

This invention relates to a liquid crystal display device, and more particularly to a display device including a super twisted nematic liquid crystal composition wherein the liquid crystal includes a compound having a terminal —CN or —F radical.

Conventional super twisted nematic (STN) type liquid crystal display devices are often utilized in liquid crystal display devices in personal computers. However, these conventional display devices have slow response times. Thus, computers equipped with these display devices are not fast enough to support a peripheral device, such as a mouse.

The following relationship exists between response time (t), viscosity ($\eta$) and the thickness of the liquid crystal layer (d):

$$t \propto \eta d^2$$

In order to decrease the response time (t) and quicken the response, it is necessary to decrease the viscosity of the liquid crystal composition or the thickness of the liquid crystal layer. When the display device is driven at a duty ratio of 1/200, it is possible to achieve a response time of 150 msec or less if d is 5.5 $\mu$m or less. If a response time of 100 msec or less is desired, d should be about 4 $\mu$m or less.

As the thickness of the liquid crystal layer is decreased, irregularities, commonly referred to as cross-talk, conspicuously appear along scan electrode lines and signal electrode lines of the liquid crystal display device. These irregularities are the result of different contrasts in nonselective modes.

Cross-talk increases as a result of an increase in the capacitance of the liquid crystal layer. In other words, cross-talk is caused by the rounding of waveform of voltage applied to the liquid crystal and spike shaped noises. The level of cross-talk depends on the scale of the rounding or the noise. As the capacitance of the liquid crystal layer increases, the rounding and the noise increases. The capacitance of the liquid crystal layer also increases as the thickness of the liquid crystal decreases. Thus, as the response speed increases, the capacitance increases and cross-talk increases, resulting in an inferior liquid crystal display device.

Accordingly, it is desirable to provide a liquid crystal display device which does not suffer from the shortcomings of the prior art and which has a fast response, reduced cross-talk and no flicker of the display.

SUMMARY OF THE INVENTION

Generally speaking, in accordance with the invention, an improved liquid crystal display device including nematic liquid crystal molecules with terminal cyano or fluoro groups disposed between a pair of electrode substrates. A polarizing plate is disposed on each side of the liquid crystal cell. The thickness (d) of the liquid crystal layer is between about 2 and 5.5 $\mu$m. The liquid crystal material is a nematic liquid crystal composition including between about 5 and 40 weight percent of a compound terminating with a cyano group or a fluoro group, preferably substituted at the 4-position of a phenyl group. The twist angle of the liquid crystal composition is between about 180° and 360°.

Accordingly, it is an object of the invention to provide an improved liquid crystal display device.

Another object of the invention is to provide an improved liquid crystal display device having reduced cross-talk.

A further object of the invention is to provide an improved liquid crystal display device having a fast response.

Still another object of the invention is to provide a liquid crystal display device having no flicker of the display.

Still other objects and advantages of the invention will in part be obvious and will in part be apparent from the specification.

The invention according comprises the apparatus embodying the features of construction, combination and arrangement of parts and relation of components, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
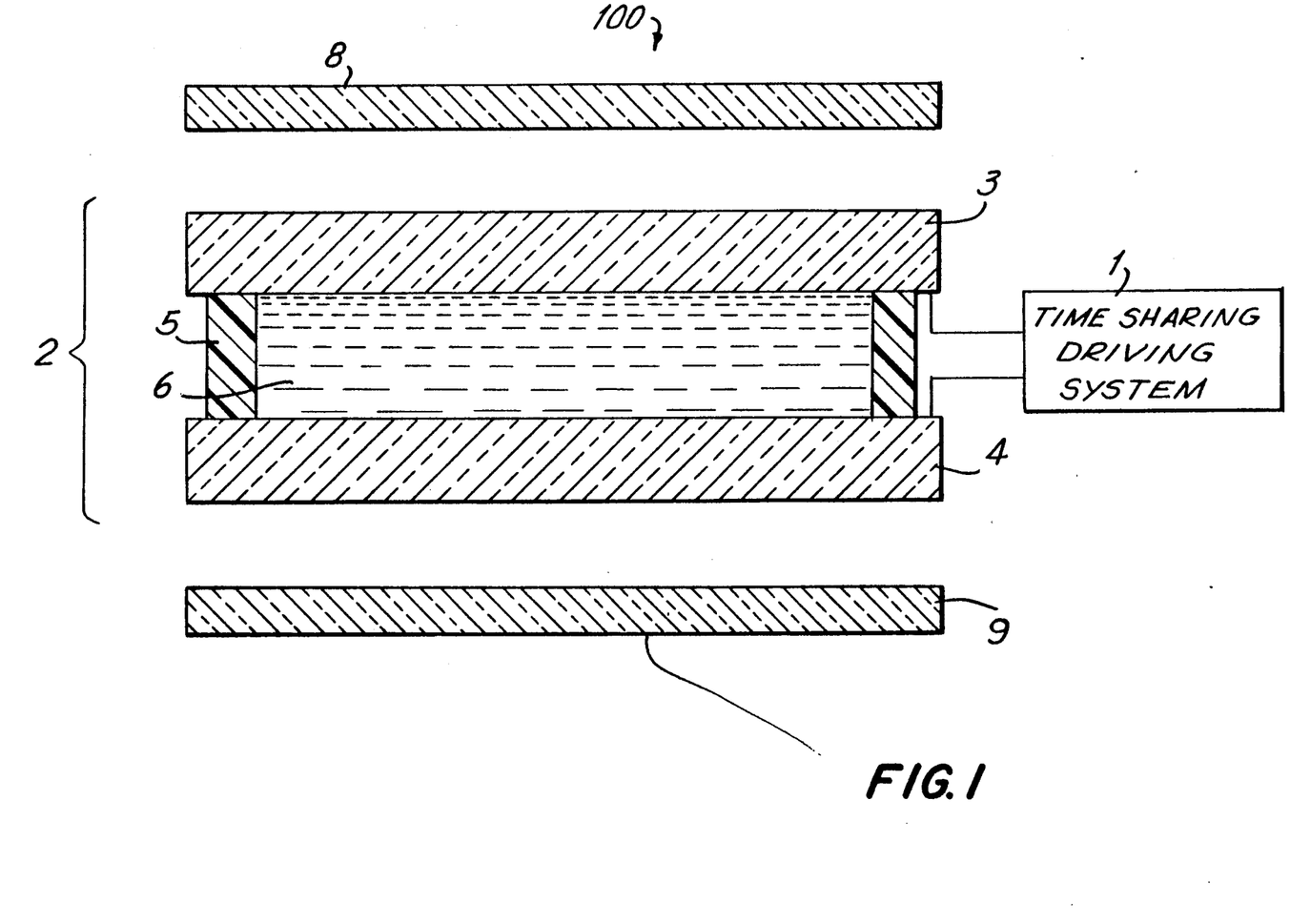
FIG. 1 is a sectional view of a liquid crystal display device in accordance with the invention.

A liquid crystal display device 100 constructed in accordance with the invention is shown in cross-section FIG. 1. Display device 100 includes a liquid crystal cell 2 having an upper electrode substrate 3 and a lower electrode substrate 4 spaced apart by spacer 5 about the periphery of cell 2. A liquid crystal material 6 is disposed between electrode substrates 3 and 4. The thickness (d) of liquid crystal material 6 is between about 2 and 5.5 $\mu$m thick.

Liquid crystal cell 2 has an upper polarizer 8 and a lower polarizer 9 disposed on the outer surfaces of substrates 3 and 4. An optically anisotropic material may be included between upper polarizer 8 and upper electrode substrate 3. A multiplex driving circuit 1 is connected to transparent electrodes on the interior surfaces of substrates 3 and 4 and applies time divisional signals thereto for driving liquid crystal cell 2.

Liquid crystal material 6 is a nematic liquid crystal composition including between about 5 and 40 weight percent of a liquid crystal compound terminating with a cyano group or a fluoro group. Generally, the cyano group or the fluoro group is substituted at the 4-position of a phenyl group. Preferably, the liquid crystal composition also includes 10 weight percent or less of liquid crystal compounds including a group, a group, a group or a group, and between about 20 and 60 weight percent of liquid crystal compounds including a group.

The following examples are set forth by way of illustration to show liquid crystal display devices in accordance with the invention. They are set forth for purposes of illustration only and are not intended in a limiting sense.

EXAMPLE 1

A liquid crystal display device was fabricated using the liquid crystal composition shown in Table 1 as the liquid crystal material.

TABLE 1

| Compound | Composition Ratio (wt %) | |
| --- | --- | --- |
| C$_3$H$_7$—◯—◯—CN | 8 | |
| C$_4$H$_9$—◯—◯—CN | 8 | |
| C$_2$H$_5$—⬡(H)—◯—◯—CN | 8 | 35 |
| C$_3$H$_7$—⬡(H)—◯—◯—CN | 8 | |
| C$_2$H$_5$—⬡(H)—◯—◯(F)—CN | 3 | |
| CH$_3$—◯—C≡C—◯—CH$_3$ | 15 | |
| C$_6$H$_{13}$—◯—C≡C—◯—CH$_3$ | 15 | 45 |
| C$_4$H$_9$—◯—C≡C—◯—C$_4$H$_9$ | 15 | |
| CH$_3$—⬡(H)—COO—◯—C$_3$H$_7$ | 10 | |
| C$_4$H$_9$—⬡(H)—COO—◯—C$_3$H$_7$ | 10 | |

EXAMPLE 2

A liquid crystal display device was fabricated in the same manner as in Example 1 using the liquid crystal composition shown in Table 2 as the liquid crystal material.

TABLE 2

| Compound | Composition Ratio (wt %) | |
| --- | --- | --- |
| C$_3$H$_7$—◯—◯—CN | 10 | |
| C$_4$H$_9$—◯—◯—CN | 10 | 23 |
| C$_2$H$_5$—⬡(H)—◯—◯(F)—CN | 3 | |

5

TABLE 2-continued

| Compound | | Composition Ratio (wt %) | |
|---|---|---|---|
|  | 6 | | |
|  | 6 | | |
|  | 15 | } | 45 |
|  | 15 | | |
|  | 15 | | |
|  | 10 | | |
|  | 10 | | |

EXAMPLE 3

A liquid crystal display device was fabricated in the same manner as in Example 1 using the liquid crystal composition shown in Table 3 as the liquid crystal material.

TABLE 3

| Compound | Composition Ratio (wt %) | |
|---|---|---|
|  | 3 | } 7 |
|  | 3 | |
|  | 1 | |
|  | 10 | |

6

TABLE 3-continued

| Compound | | Composition Ratio (wt %) | |
|---|---|---|---|
|  | 9 | | |
|  | 20 | } | 50 |
|  | 15 | | |
|  | 15 | | |
|  | 12 | | |
|  | 12 | | |

EXAMPLE 4

A liquid crystal display device was fabricated in the same manner as in Example 1 using the liquid crystal composition shown in Table 4 as the liquid crystal material.

TABLE 4

| Compound | Composition ratio (wt %) | |
|---|---|---|
|  | 10 | |
|  | 7 | |
|  | 7 | } 34 |
|  | 7 | |
|  | 3 | |

TABLE 4-continued

| Compound | Composition ratio (wt %) | |
|---|---|---|
|  C₃H₇—⬡—◯—◯—⬡—C₃H₇ (with F) | 3 | } 6 |
|  C₅H₁₁—⬡—◯—◯—⬡—C₃H₇ (with F, F) | 3 | |
|  CH₃—◯—C≡C—◯—CH₃ | 15 | } 45 |
|  C₆H₁₃—◯—C≡C—◯—CH₃ | 15 | |
|  C₄H₉—◯—C≡C—◯—C₄H₉ | 15 | |
|  CH₃—⬡—COO—◯—C₃H₇ | 8 | |
|  C₄H₉—⬡—COO—◯—C₃H₇ | 7 | |

EXAMPLE 5

A liquid crystal display device was fabricated in the same manner as in Example 1 using the liquid crystal composition shown in Table 5 as the liquid crystal material.

TABLE 5

| Compound | Composition Ratio (wt %) | |
|---|---|---|
|  C₃H₇—⬡—◯—CN | 3 | } 6 |
|  C₄H₉—⬡—◯—CN | 3 | |
|  C₃H₇—⬡—COO—◯—CH₃ (with CN, CN) | 8 | |

TABLE 5-continued

| Compound | Composition Ratio (wt %) | |
|---|---|---|
|  CH₃—◯—C≡C—◯—CH₃ | 15 | } 45 |
|  C₆H₁₃—◯—C≡C—◯—CH₃ | 15 | |
|  C₄H₉—◯—C≡C—◯—C₄H₉ | 15 | |
|  C₂H₅—⬡—◯—C₃H₇ | 15 | |
|  C₃H₇—⬡—◯—◯—⬡—C₃H₇ | 6 | |
|  C₅H₁₁—⬡—◯—◯—⬡—C₃H₇ | 6 | |
|  C₅H₁₁—⬡—◯—◯—C₃H₇ | 14 | |

COMPARATIVE EXAMPLE 1

A liquid crystal display device was fabricated in the same manner as in Example 1 using the conventional liquid crystal composition shown in Table 6 as the liquid crystal material.

TABLE 6

| Compound | Composition Ratio (wt %) | |
|---|---|---|
|  C₃H₇—◯—◯—CN | 10 | |
|  C₄H₉—◯—◯—CN | 10 | |
|  C₂H₅—⬡—◯—◯—CN | 10 | |
|  C₃H₇—⬡—◯—◯—CN | 10 | } 60 |
|  C₂H₅—⬡—⬡—◯—F | 8 | |

TABLE 6-continued

| Compound | Composition Ratio (wt %) |
|---|---|
| C₃H₇–⟨H⟩–⟨H⟩–⟨O⟩–F | 8 |
| C₂H₅–⟨H⟩–⟨O⟩(F)–CN | 4 |
| CH₃–⟨O⟩–C≡C–⟨O⟩–CH₃ | 15 } |
| C₆H₁₃–⟨O⟩–C≡C–⟨O⟩–CH₃ | 10 } 40 |
| C₄H₉–⟨O⟩–C≡C–⟨O⟩–C₄H₉ | 15 } |

COMPARATIVE EXAMPLE 2

A liquid crystal display device was fabricated in the same manner as in Example 1 using the conventional liquid crystal composition shown in Table 7 as the liquid crystal material.

TABLE 7

| Compound | Composition Ratio (wt %) |
|---|---|
| C₃H₇–⟨O⟩–⟨O⟩–CN | 10 |
| C₄H₉–⟨O⟩–⟨O⟩–CN | 10 |
| C₂H₅–⟨O⟩–⟨O⟩–⟨O⟩–CN | 10 } 52 |
| C₃H₇–⟨O⟩–⟨O⟩–⟨O⟩–CN | 10 |
| C₂H₅–⟨H⟩–⟨H⟩–⟨O⟩–F | 8 |
| C₂H₅–⟨H⟩–⟨O⟩(F)–CN | 4 |

TABLE 7-continued

| Compound | Composition Ratio (wt %) |
|---|---|
| C₃H₇–⟨H⟩–⟨O⟩–⟨O⟩–⟨H⟩–C₃H₇ (F) | 5 } |
| C₅H₁₁–⟨H⟩–⟨O⟩–⟨O⟩–⟨H⟩–C₃H₇ (F) | 5 } 14 |
| CH₃–⟨O⟩–C≡C–⟨O⟩–CH₃ | 15 } |
| C₆H₁₃–⟨O⟩–C≡C–⟨O⟩–CH₃ | 8 } 38 |
| C₄H₉–⟨O⟩–C≡C–⟨O⟩–C₄H₉ | 15 } |

An optical activator, S-811 (manufactured by Merck, Inc.), was added to the compositions of Examples 1–5 and Comparative Examples 1 and 2 to adjust the twist angle of the display device to 240°. In Examples 1–5 and Comparative Examples 1–2, the liquid crystal composition includes between about 20 and 60 wt % of a liquid crystal compound including a group. In each example, The upper and lower polarizing plates had an absorption axis shifted 45° with respect to the rubbing direction of each adjacent electrode substrate.

Figure 2:
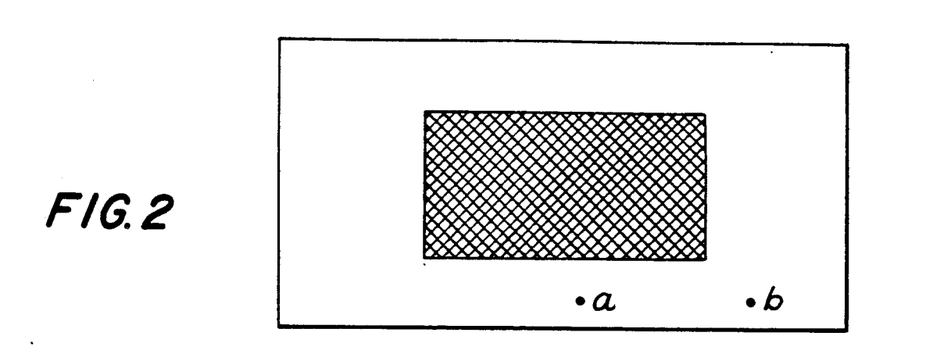
FIG. 2 is a plan view of a display illustrating the change of transmittance ($\Delta T$) of a first display between a point a and b.
Figure 3:
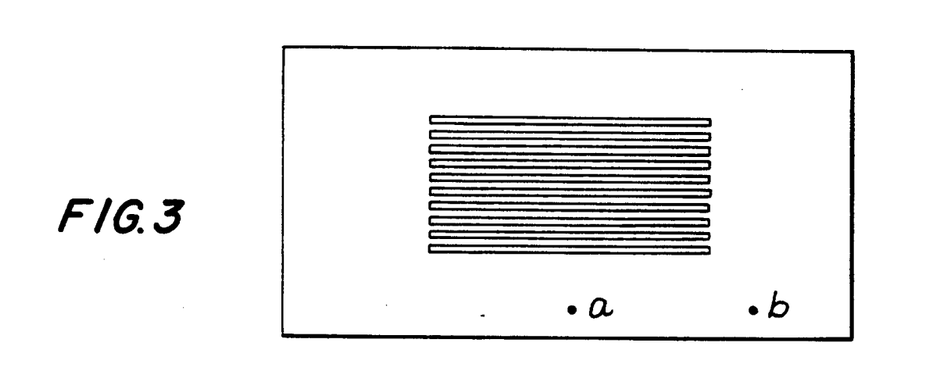
FIG. 3 is a plan view of a display illustrating the change of transmittance ($\Delta T$) of a second display between a point a and b.
Figure 4:
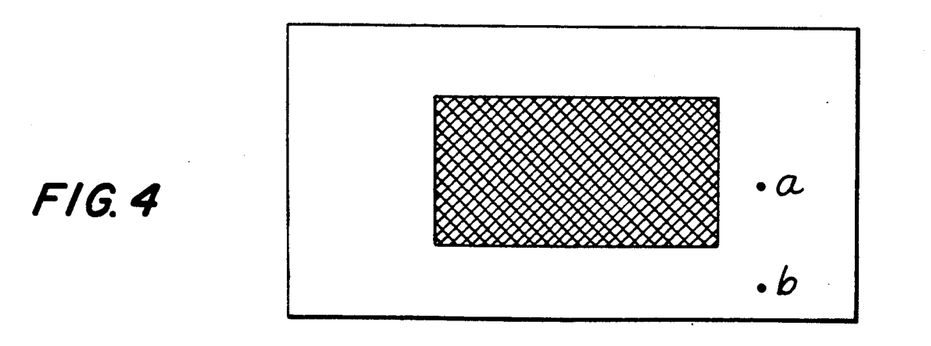
FIG. 4 is a plan view of a display illustrating the change of transmittance ($\Delta T$) of a third display between a point a and b.

In order to test for cross-talk, displays of FIGS. 2–4 were each generated for seven display devices, each containing one of the liquid crystal compositions listed in Tables 1–7. The difference of transmittance rates (ΔT) in percent (%) between the pixel "a" and pixel "b" in FIGS. 2, 3 and 4 was determined. Thus, ΔT₁ was the ΔT determined in the display of FIG. 2, ΔT₂ was the ΔT determined in the display of FIG. 3, and ΔT₃ was the ΔT determined in the display of FIG. 4. Cross-talk is more easily observed as ΔT (%) increases.

The display devices were driven at a duty ratio of 1/200. The values of the thickness of the liquid crystal layer (d), the capacitance (C) per unit area of the liquid crystal material, the contrast ratio (C.R), the response time (t), the change in transmittance of the display shown in FIG. 2(ΔT₁), the change in transmittance of the display shown in FIG. 3(ΔT₂), and the change in transmittance of the display shown in FIG. 4(ΔT₃) are shown in Table 8.

TABLE 8

| | d [μm] | C [nF/cm²] | C.R | t [ms] | ΔT₁ [%] | ΔT₂ [%] | ΔT₃ [%] |
|---|---|---|---|---|---|---|---|
| Example 1 | 4.1 | 0.8 | 9 | 130 | 3.0 | 45.5 | 6.5 |
| Example 2 | 3.9 | 0.8 | 11 | 100 | 3.0 | 43.2 | 6.3 |
| Example 3 | 4.3 | 0.6 | 11 | 90 | 2.8 | 38.8 | 6.0 |
| Example 4 | 3.8 | 0.9 | 11 | 110 | 3.0 | 46.2 | 6.2 |
| Example 5 | 3.8 | 0.8 | 12 | 100 | 3.0 | 44.9 | 6.5 |
| Comparative Example 1 | 4.3 | 1.3 | 9 | 120 | 3.1 | 55.2 | 8.3 |
| Comparative Example 2 | 4.1 | 1.5 | 12 | 150 | 3.1 | 60.2 | 7.2 |

Table 8 shows that liquid crystal display devices constructed in accordance with Examples 1-5 have lower capacitance and reduced cross-talk. In particular, ΔT₂ is reduced to a small value for a liquid crystal display device constructed in accordance with Example 3.

In addition, liquid crystal display devices including liquid crystal compositions including a group, a group, a group or a group, as in Comparative Example 2, have improved contrast and increased cross-talk. However, if the liquid crystal composition includes about 6 weight percent of compounds including a group, a group, a group or a group, as in Example 5, cross-talk is reduced and the liquid crystal display device has improved contrast and excellent results with respect to cross-talk.

Table 9 compares d, C, C.R, t, ΔT₁, ΔT₂ and ΔT₃ for liquid crystal display devices prepared in accordance with Example 3 and Comparative Example 1. For each display device, the thickness (d) of the liquid crystal layer is 3.0 μm. The product of optical anisotropy (Δn) and the thickness (d) of the liquid crystal layer is approximately 0.6 μm. The upper and lower polarizers have absorption axes crossed at right angles.

TABLE 9

| | d [μm] | C [nF/cm²] | C.R | t [ms] | ΔT₁ [%] | ΔT₂ [%] | ΔT₃ [%] |
|---|---|---|---|---|---|---|---|
| Example 3 | 3.0 | 0.8 | 7 | 50 | 3.0 | 46.5 | 6.1 |
| Comparative Example 1 | 3.0 | 1.9 | 7 | 60 | 3.2 | 82.4 | 8.3 |

As shown in Table 9, for a liquid crystal display device prepared in accordance with Example 3, wherein the thickness of the liquid crystal layer (d) is 3.0 μm, the response speed is 50 ms, which is twice as fast as the same liquid crystal display device wherein d is 4.3 μm, as shown in Table 8.

Table 10 compares d, C, C.R, t, ΔT₁, ΔT₂ and ΔT₃ for liquid crystal display devices prepared in accordance with Example 3 and Comparative Example 1 when the display devices are driven at a duty ratio of 1/400. For each display device, the thickness (d) of the liquid crystal layer is 3.4 μm. Two optically anisotropic polymer films are positioned between polarizer 8 and upper electrode substrate 3 and are arranged so that their optical axes cross at a 30° angle. The optically anisotropic polymer films optically compensate the color display of the liquid crystal cell.

TABLE 10

| | d [μm] | C [nF/cm²] | C.R | t [ms] | ΔT₁ [%] | ΔT₂ [%] | ΔT₃ [%] |
|---|---|---|---|---|---|---|---|
| Example 3 | 3.4 | 0.9 | 10 | 70 | 3.5 | 53.2 | 7.1 |
| Comparative | 3.4 | 2.2 | 10 | 80 | 3.9 | 95.2 | 9.5 |

TABLE 10-continued

| | d [μm] | C [nF/cm²] | C.R | t [ms] | ΔT₁ [%] | ΔT₂ [%] | ΔT₃ [%] |
| --- | --- | --- | --- | --- | --- | --- | --- |
| Example 1 | | | | | | | |

As shown in Table 10, a liquid crystal display device constructed in accordance with Example 3 has excellent cross-talk characteristics compared with a display device constructed in accordance with Comparative Example 1. In addition, a multi-color display was obtained when three color filters were included in a display device as arranged in Example 3.

Figure 5:
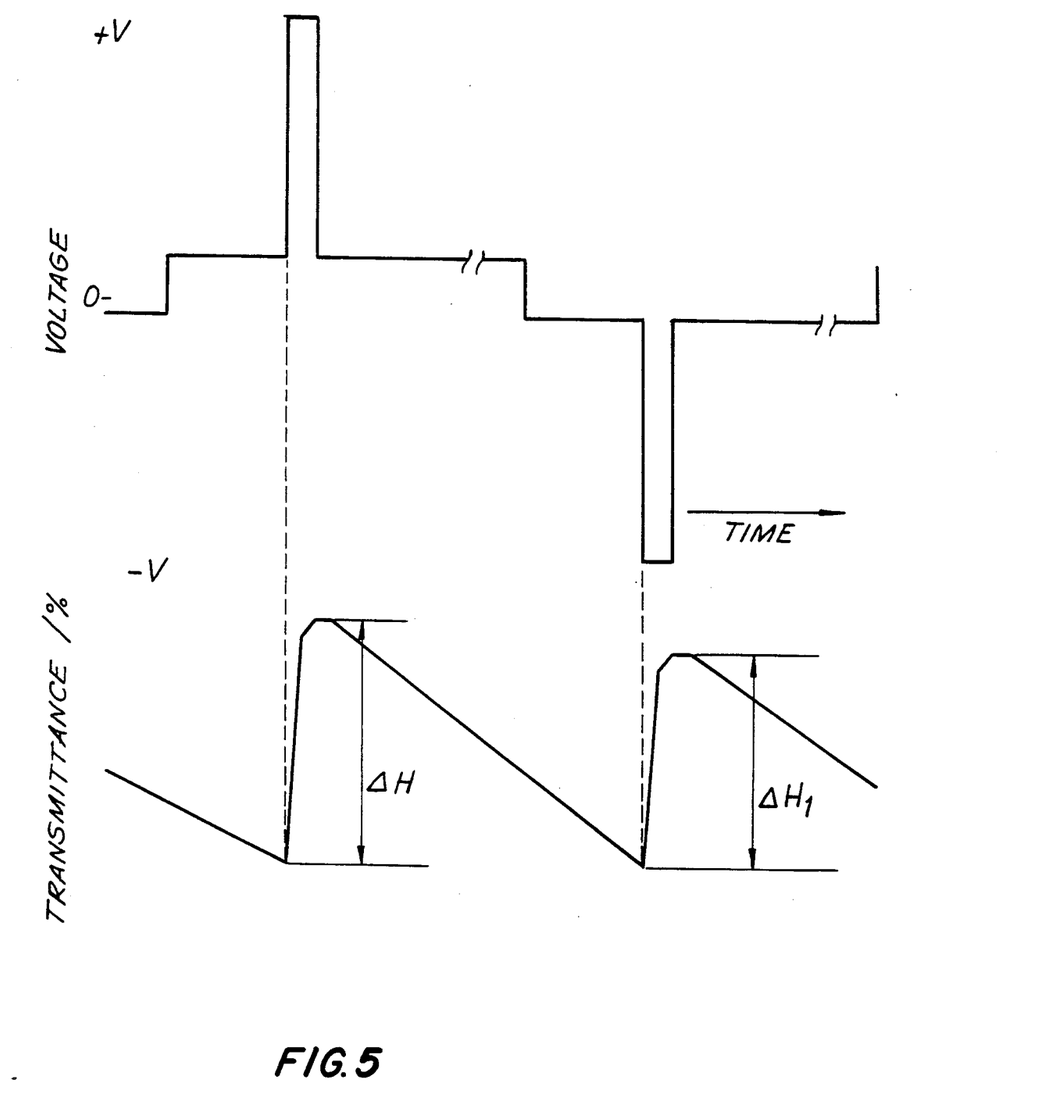
FIG. 5 is a graph illustrating flicker of a display.

The occurrence of flicker of a display device is also reduced in a device constructed in accordance with the invention. When a voltage waveform, as shown in FIG. 5, is applied, the light transmitting properties of the liquid crystal cell are changed, and the percentage of light transmitted increases. If a sharp voltage is applied at this time, the light transmitted through the liquid crystal cell radically changes. This radical change results in a flickering of the display. To obtain a display which does not flicker, it is necessary to reduce ΔH shown in FIG. 5 to a small value.

Table 11 sets forth the results comparing d and ΔH for Examples 2 and 3 and Comparative Example 1, at maximum contrast. In each case the twist angle is 240°. The results are shown in Table 11.

TABLE 11

| | d (μm) | ΔH (%) |
| --- | --- | --- |
| Example 2 | 3.9 | 7.0 |
| Example 3 | 4.3 | 6.5 |
| Comparative Example 1 | 4.3 | 8.5 |

As shown in Table 11, the liquid crystal display devices in accordance with Examples 2 and 3 have lower ΔH values than a display device constructed in accordance with Comparative Example 1. Thus, display devices assembled in accordance with the invention provide clear displays, with few problems due to flickering of the display, in comparison with the conventional display devices.

As described above, a liquid crystal display device prepared in accordance with the invention includes a liquid crystal cell in which a super twisted nematic liquid crystal material is disposed between a pair of opposed electrode substrates. The liquid crystal material is a nematic liquid crystal composition including between about 5 and 40 weight percent of at least one liquid crystal compound terminating with a cyano group or a fluoro group. The thickness of the liquid crystal layer is between about 2 and 5.5 μm and the liquid crystal material is oriented to have a twist angle between about 180° and 360°.

It will thus be seen that the objects set forth above, among those made apparent from the preceding description, are efficiently attained and, since certain changes may be made in carrying out the above embodiments and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

What is claimed is:.

1. A super-twisted liquid crystal composition comprising:

(a) a compound or compounds of formula (I) present in a total amount of from 5 to 40 weight percent of the composition:

where
X is or a single bond,
Y is n is 2, 3 or 4,
Z is H or F, and
M is CN or F;

(b) a compound or compounds of formula (II) present in a total amount of from 0 to 10 weight percent of the composition:

where
r is 3, 4 or 5,
s is 1, 2 or 3,
V is

W is or a single bond,

T is F or CN, and

U is H or T; and (c) a compound or compounds of formula (III) present in a total amount of from 20 to 40 weight percent of the composition:

(III)

where p is 1, 2, 3, 4, 5 or 6 and q is 1, 2, 3 or 4, and wherein the total combined weight percentages of compounds of formula (I) where Z is F and compounds of formula (II) is greater than 0% but less than 10%.

2. The super-twisted liquid crystal composition of claim 1, wherein the compound or compounds of formula (II) are present in at least an effective amount to decrease the capacitance of the composition.

3. A super-twisted liquid crystal display device, comprising:

a liquid crystal display cell including a pair of spaced apart opposed electrode substrates and a super-twisted nematic liquid crystal composition in the space between the substrates twisted between about 180° and 360°, the thickness of the layer of the liquid crystal composition between about 2 and 5.5 μm thick and the liquid crystal composition between about 5 and 40 weight percent of at least one liquid crystal compound having a fluoro group or a cyano group substituted at the 4-position of a terminal phenyl group, less than 10 weight percent of at least one liquid crystal compound including a group, a group, a group, or a group, and between about 20 and 60 weight percent of at least one liquid crystal compound including a group.

4. The super-twisted liquid crystal display cell of claim 3, wherein the capacitance of the cell is about 0.9 nF/cm² or less.

5. The liquid crystal display device of claim 3, wherein compound having a group, a group, a group or a group is present in an effective amount greater than 0% and less than less than 10 weight percent to decrease the capacitance of the composition.

6. A super-twisted liquid crystal display device, comprising:
a liquid crystal display cell including a pair of spaced apart opposed electrode substrates and a super-twisted nematic liquid crystal composition in the space between the substrates twisted between about 180° and 360°, the thickness of the layer of the liquid crystal composition between about 2 and 5.5 μm, the liquid crystal composition including:
(a) about 5 to 40 weight percent of the compound of formula (I)

(I)

in which $R_1$ is an alkyl group;
(b) about 1-19 weight percent of at least one compound of formula (II)

(II)

wherein and $R_2$ is an alkyl group; and
(c) about 20 to 60 weight percent of at least one compound of formula (III)

(III)

wherein $R_3$ and $R_3'$ are the same or different alkyl groups.

7. A liquid crystal display device comprising:
a liquid crystal display cell including a pair of spaced apart opposed electrode substrates and a super-twisted nematic liquid crystal composition in the space between the substrates twisted between about 180° to 360°, the thickness of the layer of the liquid crystal composition between about 2 and 5.5 μm thick, the liquid crystal composition including:

| Compound | | | | Composition Ratio (wt %) | |
|---|---|---|---|---|---|
| $C_3H_7$—⬡—⬡—CN | | | | 8 | |
| $C_4H_9$—⬡—⬡—CN | | | | 8 | |
| $C_2H_5$—⟨H⟩—⬡—⬡—CN | | | | 8 | 35 |
| $C_3H_7$—⟨H⟩—⬡—⬡—CN | | | | 8 | |
| $C_2H_5$—⟨H⟩—⬡—⬡(F)—CN | | | | 3 | |
| $CH_3$—⬡—C≡C—⬡—$CH_3$ | | | | 15 | |
| $C_6H_{13}$—⬡—C≡C—⬡—$CH_3$ | | | | 15 | 45 |
| $C_4H_9$—⬡—C≡C—⬡—$C_4H_9$ | | | | 15 | |
| $CH_3$—⟨H⟩—COO—⬡—$C_3H_7$ | | | | 10 | |
| $C_4H_9$—⟨H⟩—COO—⬡—$C_3H_7$ | | | | 10 | |

8. A liquid crystal display device comprising:
a liquid crystal display cell including a pair of spaced apart opposed electrode substrates and a super twisted nematic liquid crystal composition in the space between the substrates twisted between about 180° to 360°, the thickness of the layer of the liquid crystal composition between about 2 and 5.5 μm thick, the liquid crystal composition including:

| Compound | Composition Ratio (wt %) |
|---|---|
| $C_3H_7$—⬡—⬡—CN | 10 |

-continued

| Compound | Composition Ratio (wt %) | |
|---|---|---|
|  C₄H₉–◯–◯–CN | 10 | ⎫ 23 |
|  C₂H₅–⬡(H)–◯–◯(F)–CN | 3 | ⎭ |
|  C₃H₇–⬡(H)–◯–◯–⬡(H)–C₃H₇ | 6 | |
|  C₅H₁₁–⬡(H)–◯–◯–⬡(H)–C₃H₇ | 6 | |
|  CH₃–◯–C≡C–◯–CH₃ | 15 | ⎫ |
|  C₆H₁₃–◯–C≡C–◯–CH₃ | 15 | 45 |
|  C₄H₉–◯–C≡C–◯–C₄H₉ | 15 | ⎭ |
|  CH₃–⬡(H)–COO–◯–C₃H₇ | 10 | |
|  C₄H₉–⬡(H)–COO–◯–C₃H₇ | 10 | |

9. A liquid crystal display device comprising:
a liquid crystal display cell including a pair of spaced apart opposed electrode substrates and a super twisted nematic liquid crystal composition in the space between the substrates twisted between about 180° to 360°, the thickness of the layer of the liquid crystal composition between about 2 and 5.5 μm thick, the liquid crystal composition including:

| Compound | Composition Ratio (wt %) | |
|---|---|---|
|  C₃H₇–◯–◯–CN | 3 | ⎫ |
|  C₄H₉–◯–◯–CN | 3 | 7 |

-continued

| Compound | Composition Ratio (wt %) | |
|---|---|---|
|  C₂H₅–⬡(H)–◯–◯(F)–CN | 1 | ⎭ |
|  C₃H₇–⬡(H)–◯–◯–⬡(H)–C₃H₇ | 10 | |
|  C₅H₁₁–⬡(H)–◯–◯–⬡(H)–C₃H₇ | 9 | |
|  CH₃–◯–C≡C–◯–CH₃ | 20 | ⎫ |
|  C₆H₁₃–◯–C≡C–◯–CH₃ | 15 | 50 |
|  C₄H₉–◯–C≡C–◯–C₄H₉ | 15 | ⎭ |
|  CH₃–⬡(H)–COO–◯–C₃H₇ | 12 | |
|  C₄H₉–⬡(H)–COO–◯–C₃H₇ | 12 | |

10. A liquid crystal display device comprising:
a liquid crystal display cell including a pair of spaced apart opposed electrode substrates and a super twisted nematic liquid crystal composition in the space between the substrates twisted between about 180° to 360°, the thickness of the layer of the liquid crystal composition between about 2 and 5.5 μm thick, the liquid crystal composition including:

| Compound | Composition ratio (wt %) | |
|---|---|---|
|  C₃H₇–◯–◯–CN | 10 | ⎫ |
|  C₄H₉–◯–◯–CN | 7 | |
|  C₂H₅–◯–◯–◯–CN | 7 | 34 |

-continued

| Compound | Composition ratio (wt %) | |
|---|---|---|
| C₃H₇–⟨⟩–⟨⟩–⟨⟩–CN | 7 | |
| C₂H₅–⟨H⟩–⟨H⟩–⟨⟩–F | 3 | |
| C₃H₇–⟨H⟩–⟨⟩–⟨⟩–⟨H⟩–C₃H₇ (F) | 3 | 6 |
| C₅H₁₁–⟨H⟩–⟨⟩–⟨⟩–⟨H⟩–C₃H₇ (R, F) | 3 | |
| CH₃–⟨⟩–C≡C–⟨⟩–CH₃ | 15 | |
| C₆H₁₃–⟨⟩–C≡C–⟨⟩–CH₃ | 15 | 45 |
| C₄H₉–⟨⟩–C≡C–⟨⟩–C₄H₉ | 15 | |
| CH₃–⟨H⟩–COO–⟨⟩–C₃H₇ | 8 | |
| C₄H₉–⟨H⟩–COO–⟨⟩–C₃H₇ | 7 | |

11. A liquid crystal display device comprising:
a liquid crystal display cell including a pair of spaced apart opposed electrode substrates and a super twisted nematic liquid crystal composition in the space between the substrates twisted between about 180° to 360°, the thickness of the layer of the liquid crystal composition between about 2 and 5.5 μm thick, the liquid crystal composition including:

| Compound | Composition Ratio (wt %) | |
|---|---|---|
| C₃H₇–⟨H⟩–⟨⟩–CN | 3 | 6 |
| C₄H₉–⟨H⟩–⟨⟩–CN | 3 | |
| C₃H₇–⟨H⟩–COO–⟨⟩–CH₃ (CN, CN) | 8 | |
| CH₃–⟨⟩–C≡C–⟨⟩–CH₃ | 15 | |
| C₆H₁₃–⟨⟩–C≡C–⟨⟩–CH₃ | 15 | 45 |
| C₄H₉–⟨⟩–C≡C–⟨⟩–C₄H₉ | 15 | |
| C₂H₅–⟨H⟩–⟨⟩–C₃H₇ | 15 | |
| C₃H₇–⟨H⟩–⟨⟩–⟨⟩–⟨H⟩–C₃H₇ | 6 | |
| C₅H₁₁–⟨H⟩–⟨⟩–⟨⟩–⟨H⟩–C₃H₇ | 6 | |
| C₅H₁₁–⟨H⟩–⟨⟩–⟨⟩–C₃H₇ | 14 | |

* * * * *